June 21, 1960 L. R. ULLERY, JR 2,942,150

TELEVISION PICTURE DISPLAY APPARATUS

Filed May 29, 1957 5 Sheets-Sheet 1

VOLTAGE-CURRENT CHARACTERISTIC

INVENTOR
LEE R. ULLERY, JR.
BY Brumbaugh, Free, Graves & Donohue
HIS ATTORNEYS

June 21, 1960 L. R. ULLERY, JR 2,942,150

TELEVISION PICTURE DISPLAY APPARATUS

Filed May 29, 1957 5 Sheets-Sheet 2

INVENTOR
LEE R. ULLERY, JR
BY
Brumbaugh, Free, Graves & Donohue
HIS ATTORNEYS

June 21, 1960 L. R. ULLERY, JR 2,942,150

TELEVISION PICTURE DISPLAY APPARATUS

Filed May 29, 1957 5 Sheets-Sheet 3

INVENTOR
LEE R. ULLERY, JR
BY
Brumbaugh, Free, Graves & Donohue
HIS ATTORNEYS

TELEVISION PICTURE DISPLAY APPARATUS

Filed May 29, 1957 5 Sheets-Sheet 4

INVENTOR
LEE R. ULLERY, JR.
BY Brumbaugh, Free, Graves & Donohue
HIS ATTORNEYS

INVENTOR
LEE R. ULLERY, JR
BY Brumbaugh, Free, Graves & Donohue
HIS ATTORNEYS

United States Patent Office 2,942,150

Patented June 21, 1960

2,942,150

TELEVISION PICTURE DISPLAY APPARATUS

Lee R. Ullery, Jr., Greenwich, Conn., assignor to Columbia Broadcasting System, Inc., New York, N.Y., a corporation of New York Filed May 29, 1957, Ser. No. 662,519

10 Claims. (Cl. 315—169)

The present invention relates to devices for reproducing visual information and more particularly to new and improved apparatus of this character in which a so-called "solid state" presentation screen is used for converting electric signals into a visible display.

Since the introduction of electroluminescent phosphors, a number of solid state devices have been proposed as supplementary display screens for the presentation of video information. In general, these have been formed by sandwiching a layer incorporating electroluminescent phosphor material between crossed grids of closely-spaced, parallel conductors, commutator means being employed for selectively energizing different pairs of opposite mutually perpendicular conductors in accordance with a predetermined scanning pattern to produce light at the intersections formed by each pair. Because of capacitative coupling between the grids, however, the light generated is not confined to the intersections of energized pairs, but some light of lesser intensity is produced at other points along each of the conductors comprising an energized pair so that definition is poor.

In an effort to overcome this, it has been proposed to use a phosphor having a discontinuous brightness voltage characteristic, i.e., one for which the brightness is a linear function of voltage at low voltages, and is a third power function of the voltage at voltages above a critical voltage. By maintaining operating conditions so that the voltage at the intersection of the energized pair of conductors is in the third power region, while the voltage across the layer at every other point is zero or at least in the linear region, the light generated can be limited to the point of intersection of the energized conductors. However, even these devices are not entirely satisfactory because high A.C. energizing voltages are required for high intensity light outputs and switching such voltages at rapid rates and modulating them as a function of video information give rise to difficult problems.

It is an object of the invention, accordingly, to provide new and improved solid state devices for reproducing visual information, which are substantially free from the above-noted deficiences of the prior art.

Another object of the invention is to provide new and improved visual information reproducing devices in which elemental areas of phosphor material are adapted to be uniquely excited successively by electrical signals applied thereto.

Still another object of the invention is to provide new and improved visual information reproducing devices embodying luminescent phosphors which require neither modulation of the phosphor driving voltage nor switching of this voltage at high rates.

A further object of the invention is to provide new and improved electronic switching mechanism for applying electrical signals successively to elemental areas of phosphor material on a visual information reproducing device.

Yet another object of the invention is to provide new and improved electronic switching mechanism of the above character which incorporates means for introducing a dwell time during which the electrical signals are applied to elemental areas of the phosphor material forming part of the visual information reproducing device.

These and other objects of the invention are attained by providing a visual information reproducing device comprising adjacent, superimposed layers incorporating, respectively, electroluminescent phosphor material and material having a nonlinear impedance characteristic. One of these layers is sandwiched between a pair of parallel crossed grids each comprising a plurality of narrow, closely spaced, parallel conducting strips, the strips in one grid preferably being disposed perpendicularly to the conducting strips in the second grid. The other layer is sandwiched between one of said grids and a thin, transparent, electrically conductive planar electrode.

Alternating voltage is applied successively between the transparent conductive planar electrode and each of the conductive strips in the grid farthest therefrom. The layer materials and thicknesses are so selected that the major portion of this alternating voltage appears across the nonlinear impedance material, and there is insufficient voltage across the phosphor material to cause it to luminesce. While the A.C. voltage is being applied to each conductive strip in the grid farthest from the conductive film electrode, D.C. biasing voltages, varying, respectively, in accordance with successive elemental bits of information in a video signal representing one scanning line, are applied between the conductive planar electrode and the respective conductive strips forming the other grid. These biasing voltages reduce the impedance of elemental portions of the nonlinear layer lying between the intersections of the A.C. energized conductive strip in the one grid and the D.C. biased conductive strips in the other grid. As a result, the corresponding elemental portions of the phosphor layer luminesce, respectively, in accordance with the successive bits of information represented by the video signal from which the biasing voltages are derived, thus reproducing an image line. In a similar manner successive image lines are reproduced at a rate rapid enough to render a complete image visible to the human eye.

The invention also contemplates the provision of novel electronic switching means responsive to electronic signals representative of a scanning function and incorporating dwell time for applying the A.C. exciting voltage or the D.C. biasing voltage successively to the conductive strips in the two grids in accordance with the scanning function as required to produce a visual image.

For a better understanding of the invention, reference is made to the following detailed description of several representative embodiments taken in conjunction with the accompanying drawings in which.

Figure 1:
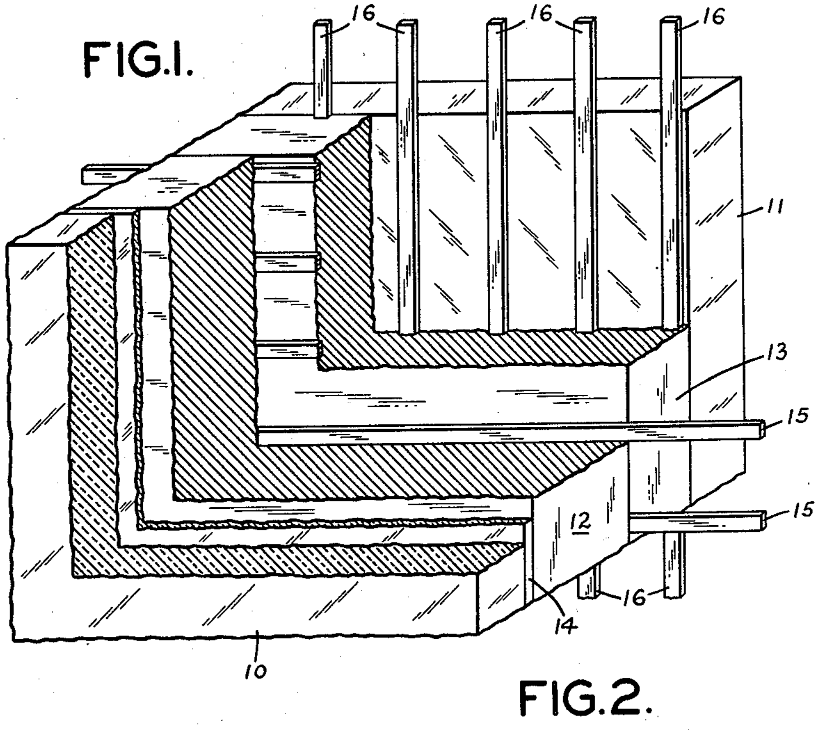
Fig. 1 is a view in perspective of part of a solid state video display screen constructed according to the invention.

Referring now to Fig. 1, a typical video display screen according to the invention may be formed by sandwiching between a front viewing plate 10 made of glass or other light transmitting material and a back plate 11 superimposed layers 12 and 13 incorporating electroluminescent phosphor material and material having a nonlinear impedance characteristic, respectively. Between the glass plate 10 and the phosphor bearing layer 12 is a transparent conductive plate electrode 14 which may be an electrically conductive glass sold under the trade name "Nesa." Also, on the opposite faces of the nonlinear element are disposed grids of parallel, closely-spaced, conductive strips 15 and 16, the strips 15 being perpendicular to the strips 16.

The strips 15 and 16 may be formed by evaporating metal on the opposite faces of the nonlinear element 13 and their number will be determined by the degree of definition desired. For definition equal to that now obtainable with commercial television apparatus, each grid should have about five hundred conductive strips with from ten to twenty strips per inch of screen. However, definition good enough for many purposes can be gotten with one hundred strips in each grid, and in the interest of simplicity the illustrative screen described below will be assumed to have this number.

The layer 12 may comprise, for example, an electroluminescent phosphor material such as ZnS:Cu embedded in a transparent dielectric which may be a resin, a fluid, or a ceramic. For a detailed disclosure of suitable electroluminescent phosphor layers, reference is made to an article entitled "Electroluminescence and Related Topics" by Destriau and Ivy, Proc. I.R.E., December 1955, at pages 1911–1940.

A suitable green electroluminescent phosphor may be made by firing the following ingredients in $N_2$ at 750° C. for two hours and then washing with saturated KCN:

| Compound: | Mole percent |
|---|---|
| ZnS:Cu | 97.0 |
| $CuCO_3Cu(OH)_2$ | 2.0 |
| $Al_2O_3$ | 1.0 |

Also, a satisfactory blue electroluminescent phosphor may be made by firing the following ingredients in $H_2S$ at 1100° C. for one-half hour and washing with KCN:

| Compound: | Mole percent |
|---|---|
| ZnS:Ag | 95. |
| ZnO | 4.05 |
| $Cu_2CO_2Cu(OH)_2$ | .33 |
| $PbCO_3$ | .53 |
| $NH_4Cl$ | 1.09 |

The layer 13 of nonlinear impedance characteristic should preferably have a voltage response that is two or three times the voltage brightness response of the electroluminescent phosphor material used in the layer 12. With the ZnS:Cu phosphor, which has a second power voltage brightness response, a nonlinear element having a sixth power voltage current characteristic should be used.

Figure 2:
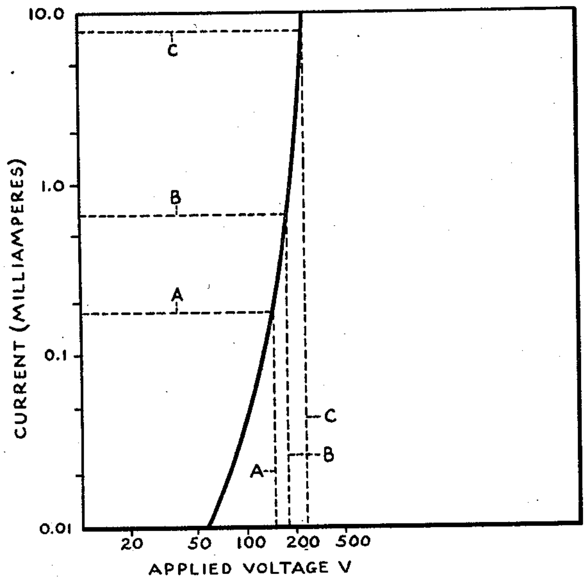
Fig. 2 is a graph of a typical voltage current characteristic of silicon carbide polarister material suitable for use in a video display screen as in Fig. 1.

One nonlinear electrical element meeting these specifications is the device known as a "polarister," a description of which appears in an article by F. A. Schwartz and J. J. Mazenko, entitled "Nonlinear Semiconductor Resistors" in vol. 24, No. 8 of The Journal of Applied Physics, 1953. In a general way, the voltage current characteristic of the polarister may be defined electrically by the equation $$i=\gamma V^n$$

which $i$ is the current through the device, V is the applied voltage, $\gamma$ is a constant determined by the diameter of the material particles, their arear and columnar length, and $n$ is a constant independent of applied voltage and in general of the order of 6 or more. Polaristers may be prepared of finely divided particles of carbon or silicon carbide and a small amount of binder, pressed together to form a layer. Fig. 2 illustrates a typical voltage current characteristic for a silicon carbide polarister which may constitute the layer 13 in the video display screen shown in Fig. 1.

The compositions of the layers 12 and 13 and their relative thicknesses are selected so that an alternating voltage applied between the transparent electrode 14 and any one of the vertical conductive strips 16 will divide in such a way that the major part voltage drop will occur across the portion of the layer 13 lying between that conductive strip and the plane of the horizontal conductive strips 15. If now a D.C. biasing voltage of appropriate magnitude is applied between the conductive plate electrode 14 and any horizontal strip 15, it will be apparent from Fig. 2 that the impedance of the part of the layer 13 lying at the intersection of the energized mutually perpendicular strips 15 and 16 will be reduced. As a result, the A.C. voltage drop across the portion of the electroluminescent layer 12 at the junction of the two strips will be increased, causing luminescence of the layer 12 at this point.

It will be readily apparent that if the biasing voltage is switched from one horizontal strip 15 to the next in a sequential fashion, while the A.C. voltage is maintained on the first of the vertical electrodes 16, one vertical line will be scanned. Further, if during the switching operation, the amplitude of the D.C. bias voltage applied between transparent electrode 14 and the horizontal strips 15 is modulated as a function of a video signal, an image line can be obtained. Then, if at the completion of the first vertical line scan, the A.C. voltage is switched to the second vertical strip 16 to produce a second image line and to other vertical electrodes in the same manner, an entire image may be described.

Actually, the foregoing brief resume of the visual presentation screen is oversimplified, because electroluminescent phosphors do not exhibit decay characteristics of a magnitude comparable to some cathode ray tube phosphors. On the contrary, when the applied A.C. field drops to zero, the radiant energy emission instantaneously falls to zero. Accordingly, if scanning is to be effected at video rates (30 frames a second), means must be provided for causing the radiant energy emission produced by the elemental areas of the display screen to last long enough to produce an image that is visible to the human eye. A typical circuit for the visible display screen of the invention embodying means for this purpose is shown in Fig. 3.

Figure 3:
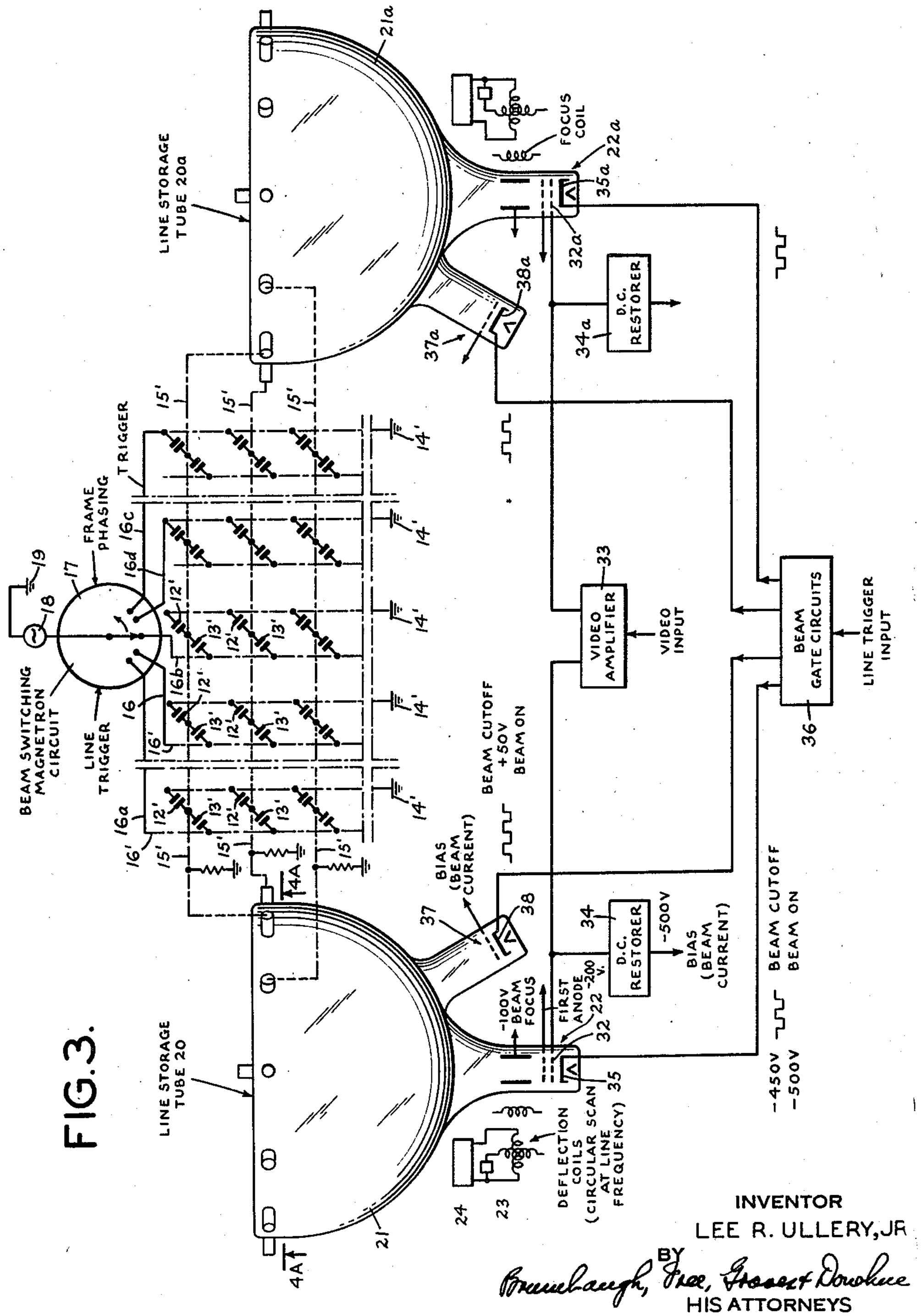
Fig. 3 is a schematic diagram illustrating a typical operating circuit incorporating the visual display screen of Fig. 1.

In Fig. 3, the video display screen is shown schematically as comprising the crossed grids of conducting strips 15' and 16', only a few of each being shown for simplicity. Elemental portions of the non-linear layer 13 and the electroluminescent layer 12 are represented by condensers 13' and 12', respectively, and the transparent electrode 14 is represented by the ground connections 14'. Each of the conductive strips 16' is connected by conductors 16a, 16b, etc., to switching means 17 such as a conventional beam switching magnetron circuit, for example. The switching means 17 is adapted to receive line trigger signals and frame-phasing trigger signals from a conventional video source (not shown) and to connect the conductive strips 16′ sequentially to one terminal of an A.C. source 18, the other terminal of which is connected to ground at 19. The source 18 may be designed to provide an output of say 1,000 volts at a frequency of $10^5$ cycles per second (c.p.s.).

The opposite ends of the horizontal conductive strips 15′ are connected to switching means comprising a pair of line storage tubes 20 and 20*a*. The tubes 20 and 20*a* are substantially identical and it will be necessary to describe only one in detail; corresponding parts of the other will be designated by the same reference numbers but with the letter *a* added.

The line storage tube 20 comprises an evacuated envelope 21 containing at one end conventional electron gun apparatus 22 for generating an electron beam. The electron beam is adapted to be deflected by deflection coils 23 responsive to scanning signals received from a source 24 to produce a circular trace on the end wall 25 of the tube 20 for each line in the original scanning function. Formed on the inside surface of the end wall 25 (Figs. 4A and 4B) are a plurality of pie-shaped segments 26 (only a few of which are shown in Fig. 3) equal in number to the number of conductive strips 15′. These may be formed of photoconductive material such as an evaporated layer of cadmium sulfide over which is superimposed a layer 27 (Fig. 4B) of a long-persistence cathode ray phosphor material such as an RMA P–2 or similar phosphor having a spectral emission which closely matches the spectral response of the cadmium sulfide. At their outer ends, the segments are connected to electrical contacts 28 extending through the envelope 21. At their inner ends, they are spaced from a metal target 29 which serves as an accelerating electrode for a flood cathode ray gun to be described below.

Alternatively, the phosphor segment material 27 may be deposited on a transparent conductive layer 50 which may be "Nesa" glass supported on a glass plate 51 secured on the inner wall of the envelope 21 and spaced from the photoconductive segments 26. The conductive layer 50 is connected by an electrode 52 to a suitable source of accelerating voltage for accelerating the electron beam from the electron gun 22.

The electrical contacts 28 are connected, respectively, to the horizontal conductive strips 15′ incorporated in the video display screen (Figs. 1 and 3).

The control grid 32 of the electron gun 22 (Fig. 3) is connected to receive video signals from a conventional video amplifier 33, D.C. restoration being provided by a conventional D.C. restorer 34 in the usual manner. The control grid 32*a* of the electron gun 22*a* of the tube 20*a* is also connected to receive video signals from the amplifier 33, D.C. restoration being effected by a D.C. restorer 34A.

The cathodes 35 and 35*a* of the tubes 20 and 20*a* are connected to receive gating pulses from conventional gate circuit means 36 responsive to the line trigger input signals. The gating pulses are so phased that the electron beams in the tubes 20 and 20*a* are simultaneously turned on and off, respectively, and vice versa.

The envelope 21 also contains a second electron gun 37 which is adapted to provide an electron beam for connecting the several photoconductive segments 26 (Fig. 4B) through the beam gate circuit means 36 in series with a source of bias voltage to ground. To this end, the electron gun 37 may be adapted to provide an unfocussed electron beam to flood the end of the photoconductive segments 26 with electrons.

The cathodes 38 and 38*a* of the electron guns 37 and 37*a* are also connected to receive gating pulses from the beam gate circuit means 36 so that when the electron guns 22 and 37 are turned off and on, respectively, the electron guns 22*a* and 37*a* are turned on and off, respectively, and vice versa.

Figure 4A:
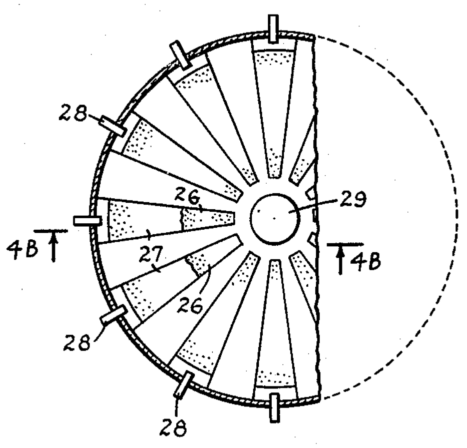
Fig. 4A is a view in transverse section, taken along the line 4A—4A of Fig. 3 and looking in the direction of the arrows, of a switching tube incorporated in the system of Fig. 3.
Figure 4B:
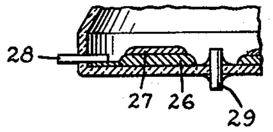
Fig. 4B is a partial view in section taken along the line 4B—4B of Fig. 4A, looking in the direction of the arrows.

In operation, let it be assumed that the electron beam from the electron gun 22 in the tube 20 has just been switched on by a gating pulse from the beam gate circuit means 36 and that the gating pulse corresponds to the beginning of an image line in the original scanning operation from which the video signal was derived. The beam now moves in a circular path over the phosphor layers 27 (Fig. 4A) causing them to luminesce. Since the beam is modulated by a video signal from the video amplifier 33 (Fig. 3), the intensity of luminescence on each of the phosphor layers 27 varies in accordance with the video signal. The light generated by the phosphor layers 27 produces corresponding changes in the conductivity of the photoconductive segments 26 (Figs. 4A and 4B).

After the electron beam has made one complete circular traverse, the several photoconductive segments 26 will vary in conductivity in accordance with successive elements of the original scanning line from which the video signal was derived. The beam gate circuit means 36 now transmits pulses to the cathodes 35 and 38, respectively, of the electron guns 22 and 37, respectively, shutting off the former and turning on the latter. The beam from the electron gun 37 now serves to connect the inner ends of the photoconductive segments 26 through the beam gate circuit means 36 to ground, thereby applying to the several conductive strips 15′ (Figs. 1 and 3) bias voltage varying in proportion to the photoconductivity of the several segments 26 (Fig. 4A).

At this time, the beam switching magnetron circuit 17 will have just connected the A.C. source 18 to the first vertical conductive strip 16. The electroluminescent phosphor material represented by the condensers 12′ associated with the first strip 16′ will, therefore, luminesce in each case to a degree depending upon the photoconductivity of the corresponding photoconductive segment 26 (Fig. 4A). Accordingly, one complete image line will be visible on the video representation screen.

Simultaneously with the turning off of the electron gun 22, pulses from the beam gate circuit means turn on the electron gun 22*a* of the tube 20*a* and turn off its flood electron gun 37*a*. The beam from the electron gun 22*a*, therefore, now traces a circular path, and it is modulated in accordance with the video signal from the amplifier 33 representing the next image line so that the photoconductive segments 26*a* in the tube 20*a* are made to vary in conductivity in a manner corresponding to the variations in the video signal. This takes place while the first image line is being exhibited on the screen, as described above. After the beam from the electron gun 22*a* has completed its circular trace, a gating pulse is again received from the beam gate circuit means 36 which shuts off the electron gun 22*a* and turns on the electron gun 37*a* to apply to the horizontal conductive strips 15′ bias in accordance with the degree of photoconductivity of the corresponding segments 26*a*.

At about this time, the beam switching magnetron circuit means 17 switches the A.C. source 18 from the first conductive strip 16 to the second vertical conductive strip 16′ so that the portions of the electroluminescent layer represented by the condensers 12′ associated with the second line are illuminated to produce a complete second image line. In this fashion, successive image lines are reproduced until all image lines in the picture originally scanned have been reproduced. Due to the persistence of vision, the eye appears to see all of the image lines at once so that the complete picture appears on the face of the visual representation screen.

It will be understood from the foregoing that while the tube 20 is supplying bias to the several horizontal conductive strips 15′, the storage tube 20*a* is being prepared to supply bias to the next succeeding line and that bias is supplied to the horizontal conductive strips 15′ alternately by the tubes 20 and 20*a*, corresponding to alternate scanning lines. Since video information representing a complete line is presented to the electroluminescent array at one time, the electroluminescent material is excited for one line scan period, so that an image clearly visible to the human eye is produced.

Figure 5:
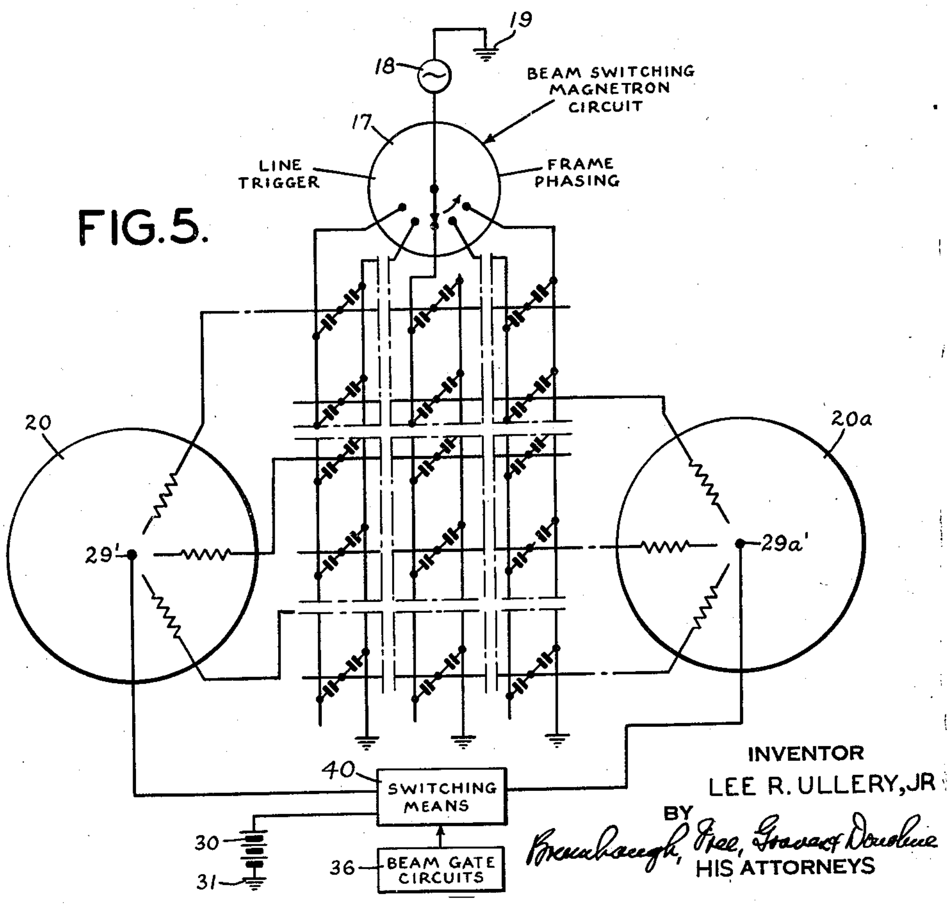
Fig. 5 illustrates a modified form of circuit system embodying the invention.
Figure 6A:
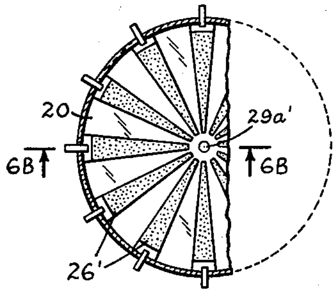
Figs. 6, 6A, 6B and 6C are views illustrating another form of switching tube suitable for use in the system of Fig. 5.
Figure 6:
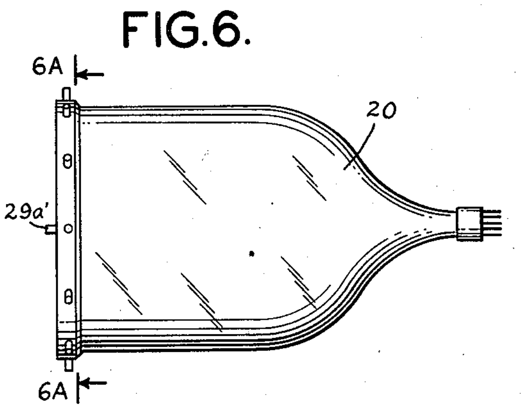

Instead of connecting the line storage tubes 20 and 20*a* to the same horizontal conductive strips 15′, the tube 20 may be connected to alternate conductive strips 15′, the tube 20*a* being connected to the intervening strips as shown in Fig. 5. In this embodiment, the line storage tubes 20 and 20*a* may be constructed in the manner shown in Figs. 6, 6A and 6B. Here the photoconductive segments 26′ are connected at their inner ends to a central electrode 29′. As shown in Fig. 5, the central electrodes 29′ and 29*a′* of the tubes 20 and 20*a* are adapted to be switched selectively by suitable electronic switching means 40 to a circuit including the battery 30 and the ground 31. The switching means 40 is adapted to be actuated at the proper times in response to gate signals received from the beam gate circuit means 36.

Figure 6B:
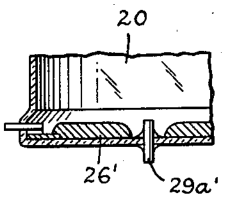
Figure 6C:
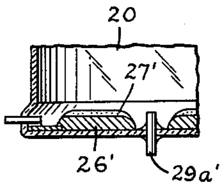

The segments 26′ may be made of photoconductive material adapted to vary in conductivity as a function of the intensity of an electron beam impinging thereon, as in Fig. 6B. Any of the well known types of photoconductors such as CdS, ZnO or CdSe may be used. Alternatively, they may have superimposed thereon a coating of long-persistent cathode ray phosphor 27′ adapted to produce a visible emission when excited by an electron beam, such as the RMA P–2 mentioned above. Preferably, the phosphor 27 should have emission properties matched to the photoconductive properties of the segments 26′.

In this form of the invention, the flood electron guns 37 and 37*a* are not needed since the application of bias to the horizontal conducting strips 15′ (Fig. 5) is accomplished by the switching means 40 which connects the appropriate one of the tubes 20 and 20*a* through the battery 30 to the ground 31. The operation of this modification is entirely analogous to the operation of the system shown in Fig. 3 and a detailed description thereof will not be necessary.

Of course, other nonlinear elements than polaristers may be used in the video display screen. For example, a nonlinear capacitor prepared by embedding silicon carbide particles in a resin may be used. In a typical embodiment, a sandwich is formed of silicon carbide in a silicon rubber-like compound sold by Dow Corning under the trade name "Silastic." The silicon particles are preferably polarized with a D.C. field during the polymerization of the resin. The capacitor so formed has nonlinear current versus voltage characteristics quite similar to that of the polarister.

It is also possible to use other materials such as, for example, so-called ferroelectric nonlinear impedance materials. These materials have the property of changing their dielectric constants as a function of the applied electric field. Hence, nonlinear elements made of them are purely capacitive. The compositions and behaviour of such materials are well known (see S. Rberts, Physical Review 71, 89 (1947)).

Figures 7, 8, 8A:
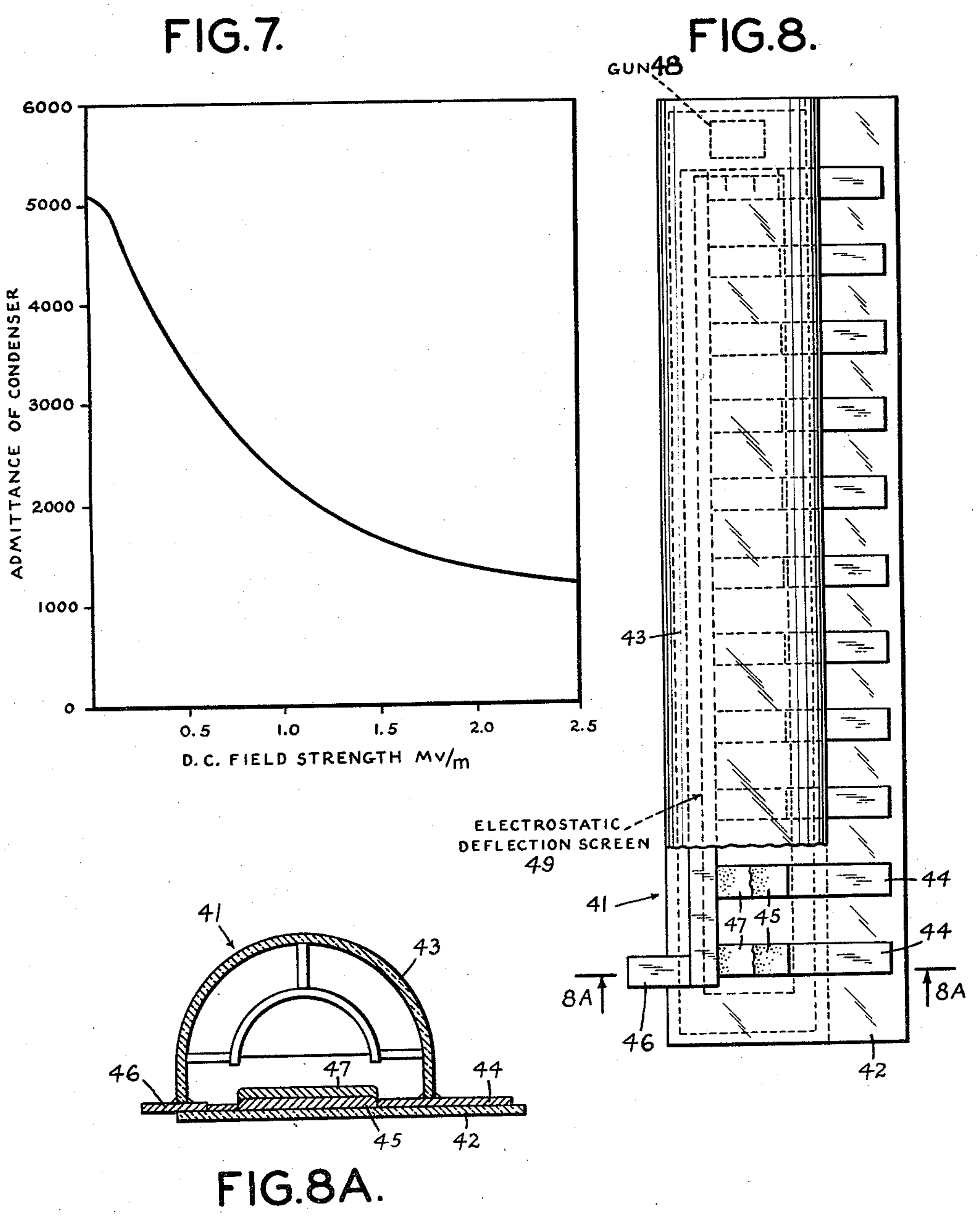
Fig. 7 is a graph illustrating the relation between A.C. capacitance and D.C. polarizing voltage for barium strontium titanate ceramic material which may be employed in a video display screen of the type shown in Fig. 1.
Fig. 8 is a plan view of another form of electronic switch according to the invention.
Fig. 8A is a view in transverse section taken along the line 8A—8A of Fig. 8, looking in the direction of the arrows.

In Fig. 7 is shown a curve illustrating the change in AC capacitance of a typical $(B_aS_r)TiO_3$ complex capacitor as a function of the biasing voltage. From this figure, it is clear that a video display screen of the type shown in Fig. 1 incorporating a nonlinear impedance layer 13 comprising such a ferroelectrical material will function in essentially the same way as the polarister-type screen described above.

Figure 4C:
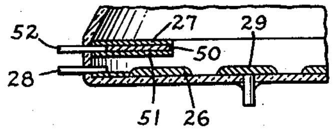
Fig. 4C is a view similar to Fig. 4B, showing an alternative form of structure.

For a video display screen capable of meeting today's television standards, it would be necessary to use horizontal and vertical grids each having 550 conducting strips. Since each of the conducting strips is required to be connected to an element of a switching mechanism of the type shown in Figs. 3, 3A and 3B, it will be appreciated that the number of leads required would present some problems. For such applications, therefore, it is convenient to employ a novel electronic switch of the type shown in Fig. 8, rather than the electronic switching mechanism shown in Figs. 4, 4A and 4B.

Referring now to Fig. 8, the switching mechanism 41 comprises a base member 42 made of glass to which is sealed a semicylindrical member 43. Formed on the plate 42 are a plurality of parallel conductive strips 44 which are adapted to extend beyond the limits of the semi-cylindrical member 43, as shown. Between each of the adjacent conductive strips 44 and a common electrode 46 perpendicular thereto is a short, photoconductive strip 45. Superimposed on each of the photoconductive elements 45 is a layer 47 of luminescent phosphor material adapted to be excited to luminescence by electron impingement thereon. The photoconductive and phosphor materials may be of the type described above in connection with Figs. 6, 6A and 6B. Preferably, the phosphor layers 47 have emission characteristics matched to the response of the photoconductive elements 45.

Disposed within the enclosure formed by the upper member 43 and the base member 42 is a conventional electron gun structure 48 which is adapted to provide an electron beam. Also, conventional deflection means 49, which may be of the type shown in Figs. 2, 3, 8 and 12 of British Patent No. 739,496, is provided for deflecting the electron beam periodically over the photoconductive coating 47.

The electronic switching mechanism 41 may be completed by making a vacuum-tight seal between the semi-cylindrical upper portion 43 and the base member 42. With the base member 42 then disposed so as to overlap the ends of the conductive strips forming one grid of a screen as in Fig. 1, each conductive strip may be capacitively coupled with the grid strips 44 of the switching mechanism.

The invention thus provides novel and highly effective visual representation screen apparatus. By utilizing electrically nonlinear material in combination with electroluminescent material, as disclosed, a relatively small D.C. biasing voltage serves to bring elemental areas of the electroluminescent material to luminescence. Further, this can be accomplished without causing undesired luminescence at other locations on the visual representation screen. Moreover, the provision of switching means incorporating dwell time of the order of the period of one line scan insures persistence of luminescence as required for the production of an image visable to the human eye.

It will be apparent that the specific devices described above by way of example are susceptible of modification within the spirit of the invention. The invention, therefore, is not intended to be restricted to the structures described and illustrated herein but comprehends all modifications thereof that fall within the scope of the following claims.

I claim:

1. Electronic switching means comprising an envelope, an array of photoconductive electrical elements in said envelope, means enabling electrical connections to said respective electrical elements from outside said envelope, means connecting said array of photoconductive elements in a plurality of electrical circuits, respectively, electron beam forming means in said envelope, means for directing said electron beam selectively to the photoconductive elements in said array, and second electron beam forming means controllable to provide electrons for flooding said array of photoconductive elements to energize each of said circuits through the photoconductive element therein.

2. Electronic switching means comprising an envelope, an array of photoconductive electrical elements in said envelope, an array of cathode ray phosphor elements superimposed on said photoconductive elements in substantial registry therewith, means enabling electrical connections to said respective electrical elements from outside said envelope, means connecting said array of photoconductive elements in a plurality of electrical circuits, respectively, electron beam forming means in said envelope, means for directing said electron beam selectively to the phosphor elements in said array, and second electron beam forming means controllable to provide electrons for flooding said array of photoconductive elements to energize each of said circuits through the photoconductive element therein.

3. Electronic switching means comprising an envelope, an array of photoconductive electrical elements in said envelope, means enabling electrical connections to said respective electrical elements from outside said envelope, electron beam forming means in said envelope, means for directing said electron beam selectively to the conductive elements in said array, and second electron beam forming means for providing electrons to flood said array of photoconductive elements.

4. Electronic switching means comprising an envelope, an array of photoconductive elements mounted in said envelope, an array of phosphor elements in illuminating relation to said respective photoconductive elements, electron beam generating means in said envelope, means for modulating said electron beam as a function of an electric signal representing one scanning line of video information, means for causing said electron beam to impinge on said phosphor elements to illuminate said respective photoconductive elements in preselected sequence and in synchronism with said electric signal, means connecting said respective photoconductive elements in a plurality of electrical circuits, and means rendered operative in timed relation to said electric signal for energizing each of said electrical circuits through the photoconductive element therein.

5. Electronic switching means comprising an envelope, an array of photoconductive elements mounted in said envelope, electron beam generating means in said envelope, means for modulating said electron beam as a function of an electric signal representing one scanning line of video information, means for causing said electron beam to impinge on said photoconductive elements in preselected sequence and in synchronism with said electric signal, means connecting said respective photoconductive elements in a plurality of electrical circuits, and second electron gun means rendered operative after impingement of said electron beam on the last photoconductive element of said sequence for energizing each of said electrical circuits through the photoconductive element therein.

6. In combination, a visual presentation screen comprising a grid of closely-spaced conductive elements, first means responsive to an electric signal representing one scanning line of information for producing a plurality of bias voltages representing, respectively, successive elemental parts of said scanning line of information, first means for applying said bias voltages to said respective conductive elements, second means rendered operative in out-of-phase timed relation to said first bias voltage producing means and responsive to an electric signal representing a subsequent scanning line of information for producing a second plurality of bias voltages representing, respectively, successive elemental parts of said subsequent scanning line of information, and second means rendered operative in out-of-phase timed relation to said first bias voltage applying means for applying said second plurality of bias voltages, respectively, to said conductive elements.

7. In combination, a visual presentation screen comprising a grid of closely-spaced conductive elements, first means responsive to an electric signal representing one scanning line of information for producing a plurality of bias voltages representing, respectively, successive elemental parts of said scanning line of information, first means for applying said bias voltages to alternate ones of said respective conductive elements, second means rendered operative in out-of-phase timed relation to said first bias voltage producing means and responsive to an electric signal representing a subsequent scanning line of information for producing a second plurality of bias voltages representing, respectively, successive elemental parts of said subsequent scanning line of information, and second means rendered operative in out-of-phase timed relation to said first bias voltage applying means for applying said second plurality of bias voltages, respectively, to second alternate ones of said conductive elements lying between said first alternate ones of said conductive elements.

8. In visual representation apparatus, the combination of a visual presentation screen comprising superimposed layers of electroluminescent material and electrically nonlinear material, crossed grids of parallel, closely-spaced conductive elements disposed on opposite sides of said layer of electrically nonlinear material, and a light transmitting electrically conductive electrode on the outer surface of said layer of electroluminescent material; means rendered operative in timed relation to a sequential electric signal representing successive scanning lines of video information for applying an A.C. exciting voltage in succession to the conductive elements of one of said grids; means rendered operative in timed relation to said electric signal for generating a plurality of D.C. bias voltages representing, respectively, successive elemental parts of a scanning line of information, and means rendered operative in timed relation to said electric signal for applying said D.C. bias voltages to the respective conductive elements of the other of said conductive grids for the duration of a scanning line.

9. Visual representation apparatus as defined in claim 8 together with second means rendered operative in out-of-phase timed relation to said first bias generating means for generating a second plurality of D.C. bias voltages representing, respectively, successive elemental parts of a subsequent scanning line, and second means rendered operative in out-of-phase timed relation to said first bias applying means for applying said second D.C. bias voltages to the respective conductive elements of the other of said conductive grids for the duration of a scanning line.

10. Visual representation apparatus as defined in claim 8 in which said bias voltages are applied to first alternate ones of the conductive elements in the other of said grids, together with second means rendered operative in out-of-phase timed relation to said first bias generating means for generating a second plurality of D.C. bias voltages representing, respectively, successive elemental parts of a subsequent scanning line, and second means rendered operative in out-of-phase timed relation to said first bias applying means for applying said second D.C. bias voltages to second alternate ones of the conductive elements of the other of said conductive grids lying between the first alternate ones of said conductive elements for the duration of a scanning line.

References Cited in the file of this patent

UNITED STATES PATENTS

| | | |
|---|---|---|
| 1,779,748 | Nicholson | Oct. 28, 1930 |
| 2,056,301 | Schroter | Oct. 6, 1936 |
| 2,136,441 | Karolus | Nov. 15, 1938 |
| 2,214,019 | Gray | Sept. 10, 1940 |
| 2,395,299 | Skellett | Feb. 19, 1946 |
| 2,588,292 | Rittner et al. | Mar. 4, 1952 |
| 2,589,704 | Kirkpatrick et al. | Mar. 18, 1952 |
| 2,594,740 | De Forest et al. | Apr. 29, 1952 |
| 2,749,480 | Ruderfer | June 5, 1956 |
| 2,760,169 | Toulon | Aug. 21, 1956 |
| 2,773,992 | Ullery | Dec. 11, 1956 |
| 2,774,813 | Livingston | Dec. 18, 1956 |
| 2,873,380 | Kazan | Feb. 10, 1959 |
| 2,877,371 | Orthuber et al. | Mar. 10, 1959 |